(12) United States Patent
Hahn et al.

(10) Patent No.: US 6,499,169 B2
(45) Date of Patent: Dec. 31, 2002

(54) RECYCLE CONTROL SYSTEM FOR DOCK LEVELERS

(76) Inventors: Norbert Hahn, 6869 Tumble Creek Dr., Franklin, WI (US) 53132; Mike Jehn, S52 W23185 Amy Ct., Waukesha, WI (US) 53186; Robert Stoewe, 4513 Durand Ave., Racine, WI (US) 53405; Michael A. Swessel, N76 W. 15031 Menomonee Manor Dr., Menomonee Falls, WI (US) 53051

(*) Notice: Subject to any disclaimer, the term of this patent is extended or adjusted under 35 U.S.C. 154(b) by 46 days.

(21) Appl. No.: 09/829,675

(22) Filed: Apr. 10, 2001

(65) Prior Publication Data

US 2001/0039687 A1 Nov. 15, 2001

Related U.S. Application Data

(62) Division of application No. 09/094,295, filed on Jun. 9, 1998, now abandoned.

(51) Int. Cl.[7] .................................................. E01D 1/00
(52) U.S. Cl. ........................ 14/71.7; 14/71.3; 14/71.1; 14/69.5
(58) Field of Search ................................ 14/69.5, 71.1, 14/71.3, 71.7

(56) References Cited

U.S. PATENT DOCUMENTS

| | | | |
|---|---|---|---|
| 3,201,814 A | 8/1965 | LeClear | 14/71 |
| 3,290,709 A | 12/1966 | Whitenack, Jr. et al. | 14/71 |
| 3,388,413 A | 6/1968 | Clarke | 14/71 |
| 4,365,374 A | 12/1982 | Bennett | 14/71.1 |
| 4,488,325 A | 12/1984 | Bennett et al. | 14/71.3 |
| 4,827,549 A * | 5/1989 | Walker | 14/71.7 |
| 4,944,062 A | 7/1990 | Walker | 14/71.3 |
| 4,977,635 A | 12/1990 | Alexander | 14/71.3 |
| 4,979,253 A | 12/1990 | Alexander | 14/71.7 |
| 5,040,258 A | 8/1991 | Hahn et al. | 14/71.3 |
| 5,088,143 A * | 2/1992 | Alexander | 14/69.5 |
| 5,205,010 A | 4/1993 | Hageman | 14/71.7 |
| 5,457,838 A * | 10/1995 | Gelder et al. | 14/69.5 |
| 5,511,267 A | 4/1996 | Alexander | 14/71.7 |
| 5,526,545 A | 6/1996 | Alexander | 14/71.3 |
| 5,553,343 A | 9/1996 | Alexander | 14/71.1 |
| 5,586,356 A | 12/1996 | Alexander | 14/71.1 |
| 5,774,920 A | 7/1998 | Alexander | 14/71.3 |
| 5,784,740 A | 7/1998 | DiSieno et al. | 14/71.1 |
| 5,826,291 A | 10/1998 | Alexander | 14/71.3 |
| 6,065,172 A * | 5/2000 | Swessel | 14/71.7 |
| 6,112,353 A * | 9/2000 | Winter | 14/71.3 |

FOREIGN PATENT DOCUMENTS

| | | |
|---|---|---|
| CA | 1 146 309 | 5/1983 |
| DE | 30 49 611 A1 | 7/1982 |

OTHER PUBLICATIONS

*International Search Report,* International Patent Application Serial No. PCT/US99/13058, corresponding to U.S. Patent Application Serial No. 09/094,295, Sep. 28, 1999, 8 pages.

* cited by examiner

Primary Examiner—Gary S. Hartmann
(74) *Attorney, Agent, or Firm*—Marshall, Gerstein & Borun

(57) ABSTRACT

A recycling control system for a dock leveler including a pivotally mounted deck. There is a powered lifting mechanism for raising the deck and a lip pivotally mounted to the deck for movement between pendant and extended positions. The control assembly includes a lip-position member couplable to the lip for movement therewith such that the position of the lip-position member is indicative of lip position. There is a switch couplable to the lifter and operable to a first condition wherein power is provided to the lifter and operable to a second condition wherein power is not provided to the lifter. There is an actuator disposed on the lip-position member for movement relative thereto between at least a first position where the actuator operates the switch to the first condition, and a second position where the switch can be operated to the second condition. The actuator is disposed to move between the first and second positions as the lip moves toward the pendant position.

7 Claims, 15 Drawing Sheets

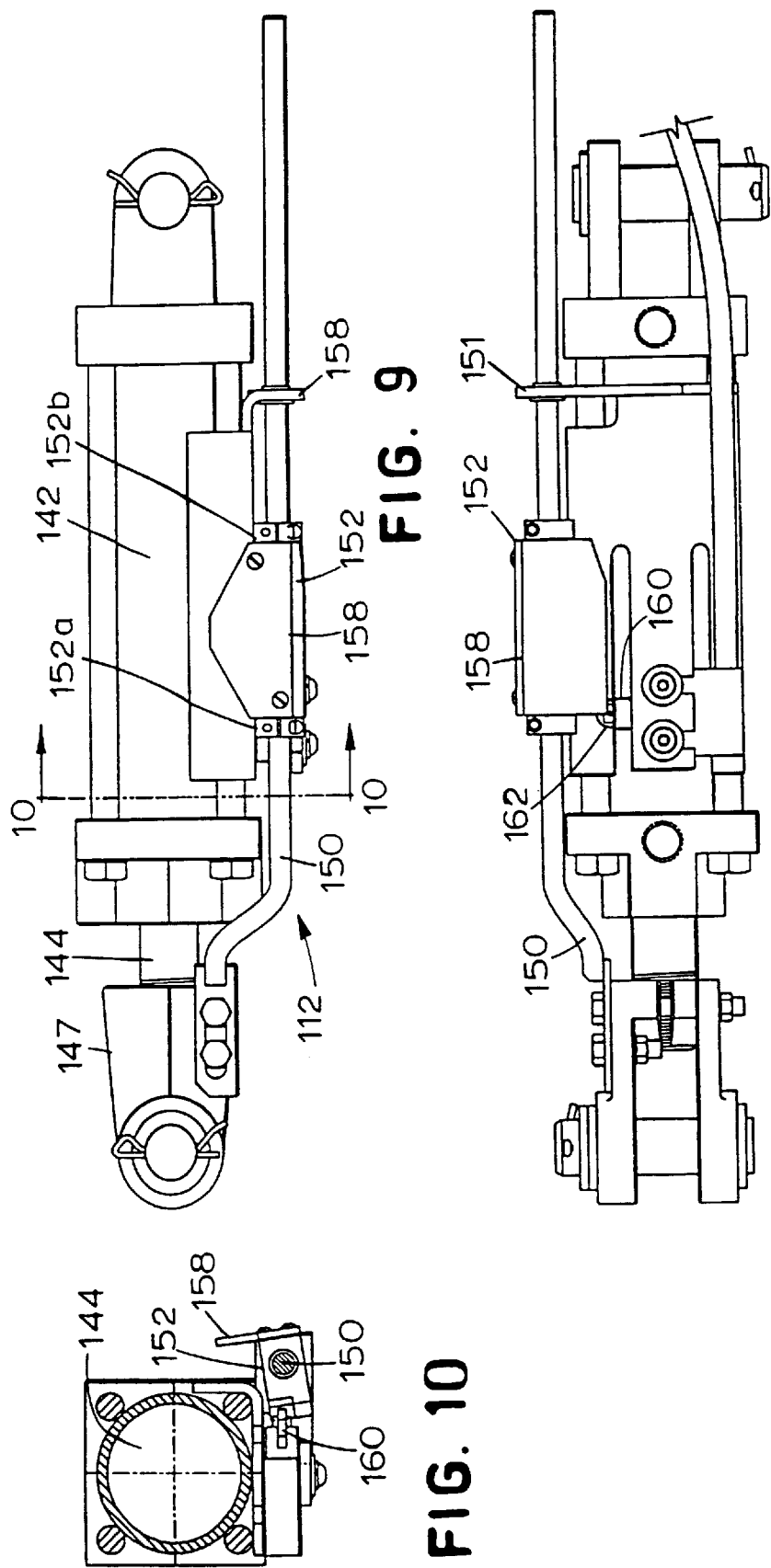

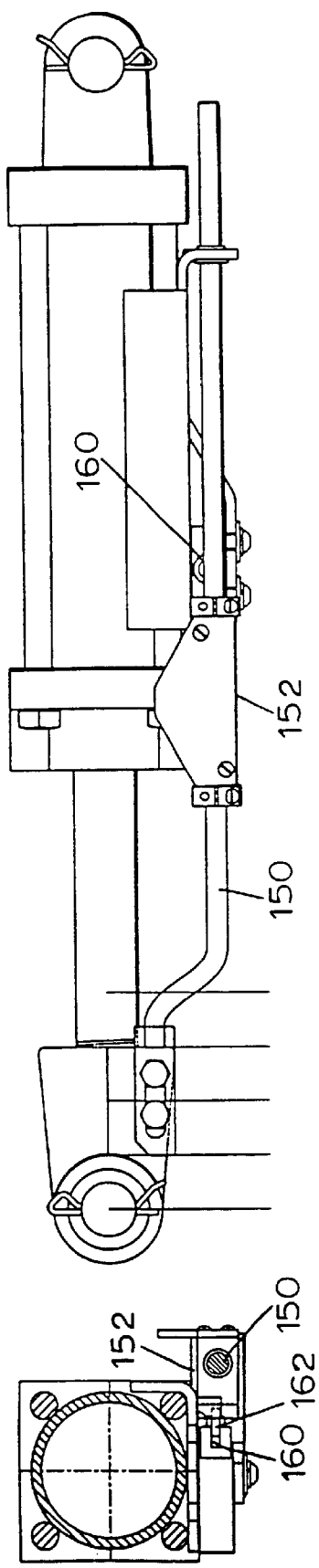
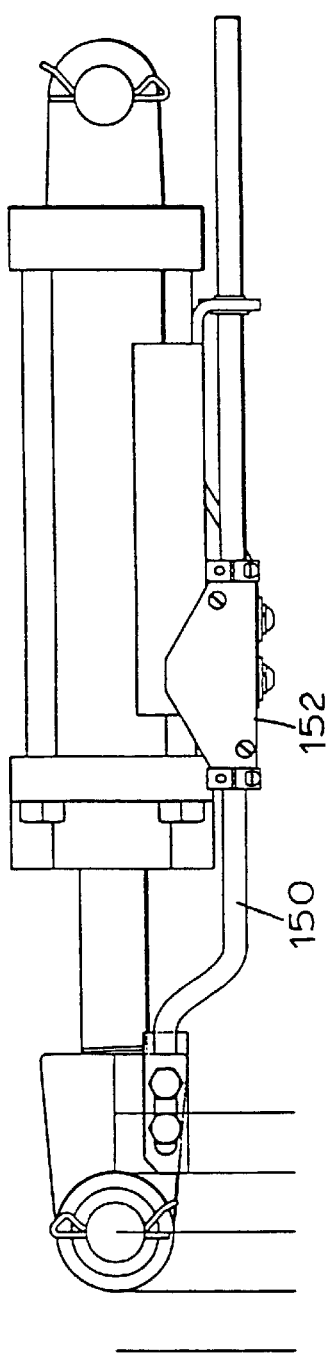
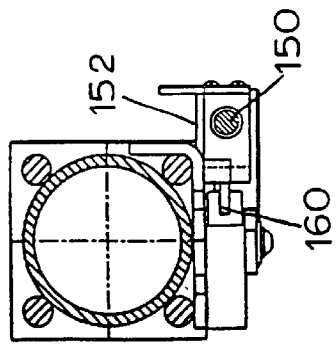
FIG. 15a
FIG. 15b
FIG. 16a
FIG. 16b

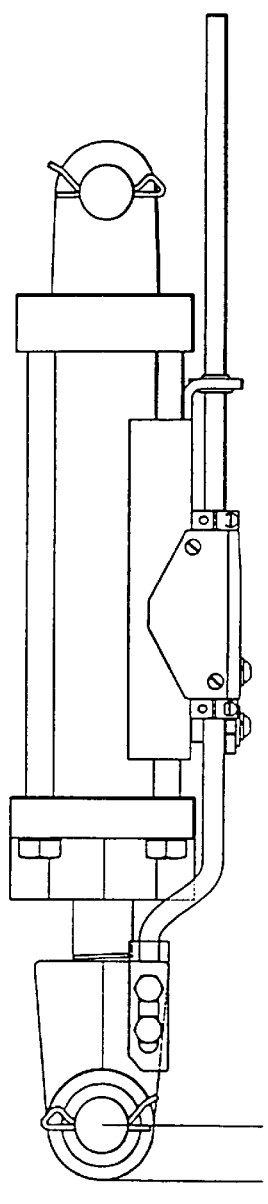
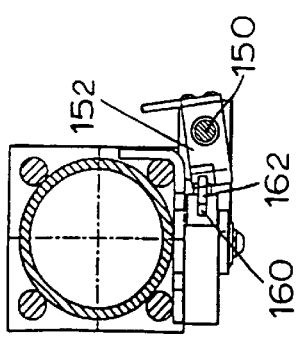
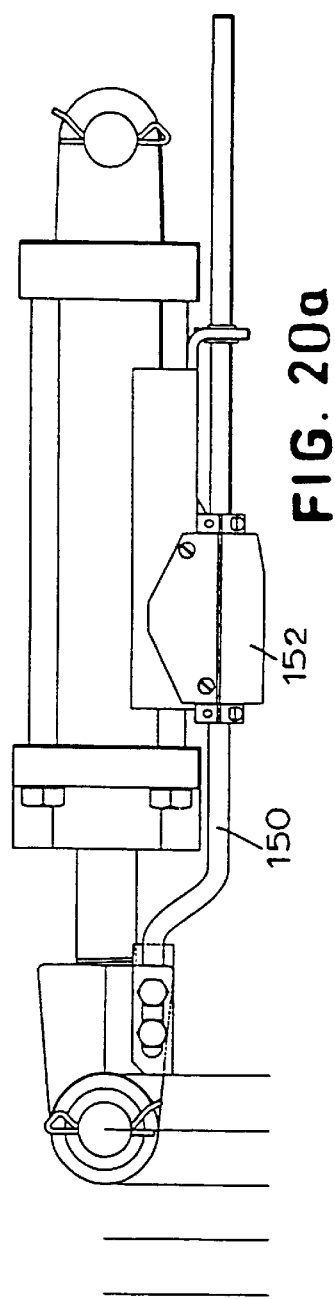
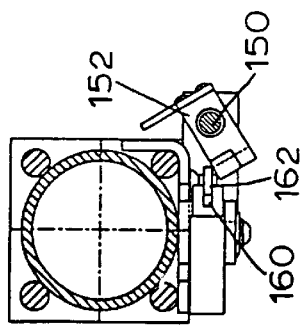
FIG. 19a
FIG. 19b
FIG. 20a
FIG. 20b

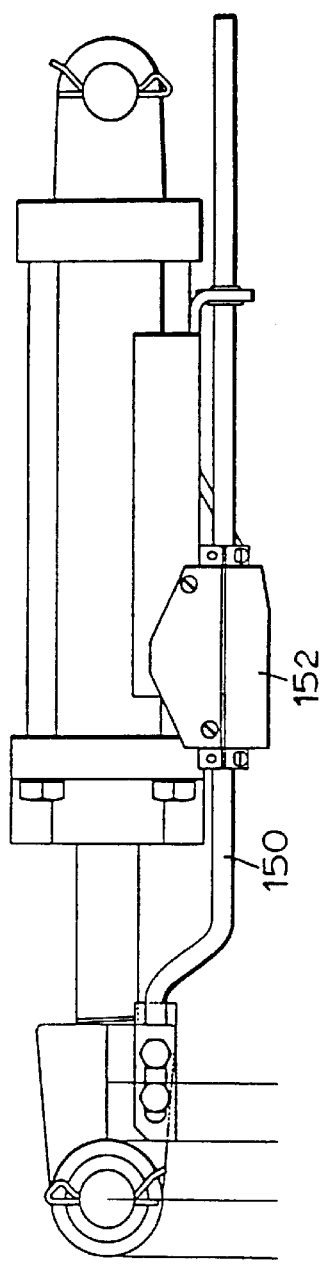
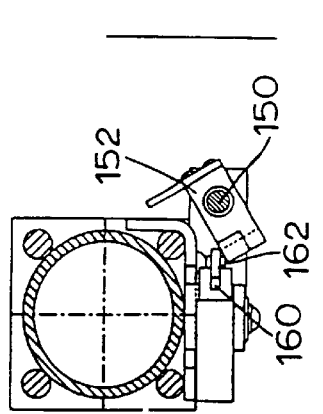
FIG. 21a
FIG. 21b
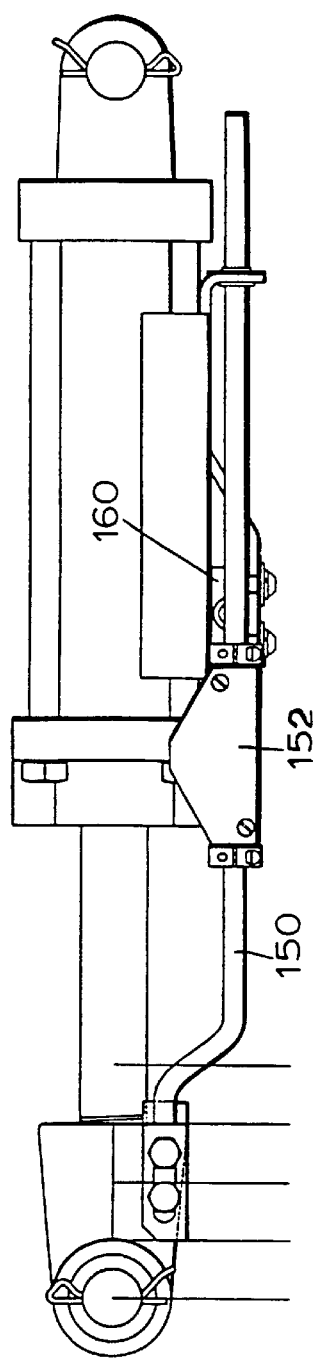
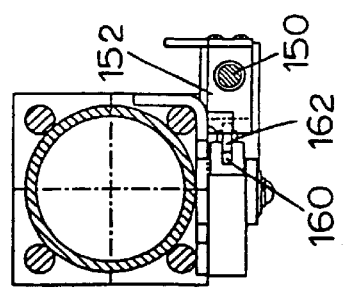
FIG. 22a
FIG. 22b

RECYCLE CONTROL SYSTEM FOR DOCK LEVELERS

This is a continuation of U.S. Ser. No. 09/094,295 filed Jun. 9, 1998, now abandoned.

FIELD OF THE INVENTION

The present invention relates generally to dock leveling equipment and, more particularly, to a recycle system for dock levelers which helps to ensure that the lip of the dock leveler is properly moved into its retracted or pendant position before the dock leveler is moved into its cross-traffic or stored position.

BACKGROUND OF THE INVENTION

Dock levelers are utilized to compensate for height differences between a dock platform and the bed of a vehicle parked adjacent the dock, and to form a bridge therebetween so that personnel and moving equipment may readily move on and off the vehicle during loading and unloading operations. Typical dock levelers includes a dockboard or deck which is pivotally hinged at its back edge to vary the height of the dock leveler, and an extension plate or lip which is pivotally hinged at the deck front edge to span the distance between the rear end of the vehicle bed and the outer front edge of the deck. In use, the lip moves relative to the front edge of the deck between a retracted or pendant position, to a range of extended, operative positions, including operative positions in which the lip extends from the front edge of the deck and rests upon and is supported by the bed of the parked vehicle. The lip may also be substantially coplanar with the upper surface of the deck when in an extended, operative position. In this way, the lip spans the gap between the rear edge of the vehicle bed and the front edge of the deck.

To move the lip from the retracted or pendant position to the extended operative position, the deck is normally pivoted upwardly a sufficient amount so that the lip can swing outwardly to an extended position without obstruction from the parked vehicle. A variety of powered means may be employed for both moving the deck and extending the lip, including hydraulic cylinders, linear actuators such as screw drives, air bags, etc. Once the lip has cleared the vehicle, the deck and the extended lip are pivoted downwardly as a unit until the extended lip rests upon the bed of the vehicle in the extended operative position. Once the loading/unloading operation is complete, it is desirable to return the leveler from this position to a "cross-traffic" or stored position where the deck is coplanar (and forms an extension of) the floor of the loading dock, and the lip is in its pendant position. The leveler may be returned to the cross-traffic position by the operator raising the deck.

As the deck is raised, the lip falls by gravity toward the pendant position. Once it is fully pendant, the operator can release the raise control and allow the deck and pendant lip to float downward to the cross-traffic position, in which the pendant lip is typically received within and supported by a fixed supports referred to as "lip-keepers." Such operator-controlled restoration of the leveler to a cross-traffic position is often referred to as "lip retraction" as the lips is retracted from an extended to a pendant position during the movement.

On occasion, however, a trailer may depart without the operator performing lip retraction and restoring the leveler. If this occurs, the deck and lip float down to the deck's lowest-most position of rotation (it "bottoms-out"), i.e. angled downwardly from its rear hinge beneath the level of the surrounding floor, and the lip then falls by gravity toward a pendant position. The same result occurs when a leveler is cycled to extend the lip, but the absence of a trailer allows the deck and lip to float all the way down. This creates the potential hazard of a so-called "void in the floor" since the deck and surrounding floor are not co-planar. A solution to this problem of creating a void in the floor where lip retraction is not performed is providing the leveler with an "automatic recycle" or "automatic return to dock" mechanism, which automatically returns the leveler to a cross-traffic position.

In one conventional type of recycle mechanism, the deck is automatically raised whenever the deck is sensed to be below a predetermined angle (typically a position close to being bottomed-out). This angle is determined, for example, by means of mercury switches or proximity switches. In such a system, once the deck angle is beyond the predetermined position, the deck is raised, allowing the lip to fall pendant. A detecting means (typically the same mercury switch or a timer) determines when the deck is above a certain angle—a deck angle determined to be high enough to have allowed the lip to fall completely pendant—at which time, power to the means lifting the deck is shut off, and the deck and pendant lip are allowed to float down to a cross-traffic position. Thus, such systems automatically recycle whenever the deck is at or near its lowest-most point of rotation. Such systems are limited in application, however. Trailers are often disposed below the height of the dock floor, requiring that the leveler deck be angled downward. The weight of cargo or material handling equipment being added to the trailer can force the trailer and the deck lower. This may cause the deck to move low enough to actuate the recycle mechanism, meaning that the leveler will recycle in the midst of the loading or unloading operation—a potentially dangerous proposition for the unwary dock worker. Accordingly, levelers employing this type of recycle system usually include a manual override switch that de-activates recycle to allow below-dock use. Unless that manual override is then re-set following servicing of the below-dock trailer, this important safety feature will remain disabled indefinitely.

Another conventional type of recycle system is actuated only by the relative angular position of the lip. In one example of such a system, a linear rod reciprocates as the lip extends and retracts (indeed- in the case of a lip powered by a hydraulic cylinder, the rod is directly coupled to the piston rod of the cylinder that actuates the lip). An actuating member, such as a metal tab, is connected to the rod and the linear position of the tab is thus indicative of lip angle. A mechanical switch is fixed adjacent to the path followed by the actuating member, and is engaged by the member during certain portions of its travel. The switch includes an activated position, and when the switch is in this position, power is provided to the deck which causes the deck to raise. Accordingly, the switch is designed and disposed so that it is only activated when the lip is moving from an extended toward a retracted position. Moreover, the switch is disposed and constructed such that the lip must first extend past a certain angle such that the actuating member moves over and past the switch before the switch can move to the activated position and provide power to raise the deck. Toward that end, the switch includes some lost motion wherein it can be engaged by the actuating member as the lip extends without being activated.

Thus, in operation, as the lips is extended, that actuating member moves past the switch. As the lips subsequently falls, following trailer departure, the actuating member again engages the switch—this time causing the deck to raise. The deck continues to raise as the actuating member continues to move over and be in contact with the switch—until the lip is nearly pendant. At this point, the actuating member loses contact with the switch, and the un-powered deck can float down to the cross-traffic position with the lip pendant. This system has the significant advantage of being capable of use in below-dock conditions without the need for a manual override, since recycle is a function of lip angle, as opposed to deck position. At the same time, this system requires careful adjustment. The actuating member must be sized and positioned to engage the switch long enough for the lip to fall pendant as the deck raises while also being sized and positioned to avoid setting up recycle for the small lip extensions sometimes required for below-dock end-load situations where it is desired to lower the leveler below-dock without allowing the lip to engage the trailer. Further, the switch must include some lost motion to allow recycle set-up only for full lip extension. Moreover, the sensitive adjustments of the actuating member and the switch need to be maintained in the somewhat harsh and rugged environment of a loading dock.

SUMMARY OF THE INVENTION

There is thus provided a recycling control system for a dockleveler including a pivotally mounted deck, a powered lifting mechanism for raising the deck, and a lip pivotally mounted to the deck for movement between pendant and extended positions, in which the control assembly includes a lip-position member couplable to the lip for movement therewith such that the position of the lip-position member is indicative of lip position, a switch couplable to the lifting means and operable to a first condition wherein power is provided to the lifting means, and operable to a second condition wherein power is not provided to the lifting means, and an actuator disposed on the lip-position member for movement relative thereto between at least a first position where the actuator operates the switch to the first condition, and a second position where the switch can be operated to the second condition, the actuator being disposed to move between the first and second positions as the lip moves toward the pendant position.

These and other features and advantages of the present invention will be more readily apparent upon reading the following detailed description of preferred exemplified embodiments and upon reference to the accompanying drawings wherein:

BRIEF DESCRIPTION OF THE DRAWINGS

FIGS. 9–11 are side, section and bottom views, respectively, of another embodiment of a recycle system;

FIGS. 15a/b–22a/b are, for each number a side view (a) and an end section (b) of the other recycle system showing its operation during various phases of activation of the associated dock leveler.

Figure 1:
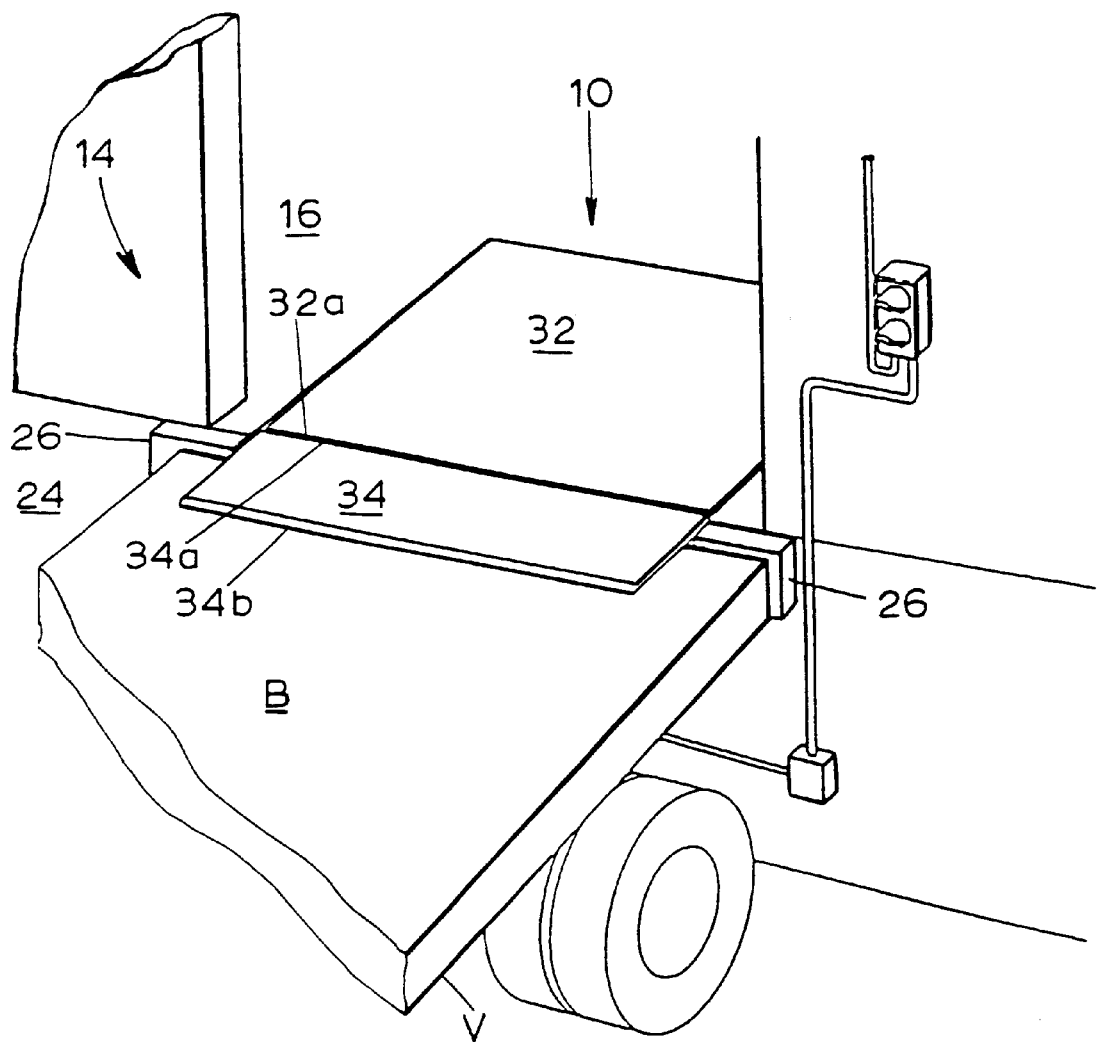
FIG. 1 is a perspective view of a dock leveler utilizing a recycle system in accordance with the invention, and showing the dock leveler in an operative position, and the lip of the dock leveler engaging the bed of a vehicle in an extended operative position.

While the present invention will be described and disclosed in connection with certain preferred embodiments, the intent is not to limit the present invention to these specific embodiments. Rather, the intent is to cover all such alternatives, modifications, and equivalents that fall within the spirit and scope of the present invention as defined by the appended claims.

DETAILED DESCRIPTION OF THE PREFERRED EMBODIMENTS

Referring to the drawings, a dock leveler 10 having a recycle control system 12 in accordance with the present invention is shown mounted in a conventional loading dock 14. As is customary in the art, the loading dock 14 has a generally planar loading surface 16, a recess or pit 18 defined by a floor and upstanding side and rear walls 20 and 22, respectively, and a front wall 24. Mounted to the front wall 24 in adjacent relationship to, but spaced apart from, the side walls 20 of the pit 18 are conventional bumpers 26 which are adapted to be engaged by the rear of a vehicle V, such as a truck, when the vehicle V is backed into a parked position relative to the dock leveler 10. In use, the bumpers 26 prevent the vehicle V from striking and possibly damaging the front wall 24 of the loading dock 14 and the various components of the dock leveler 10, and/or the vehicle itself.

Figures 2A, 2B, 2C:
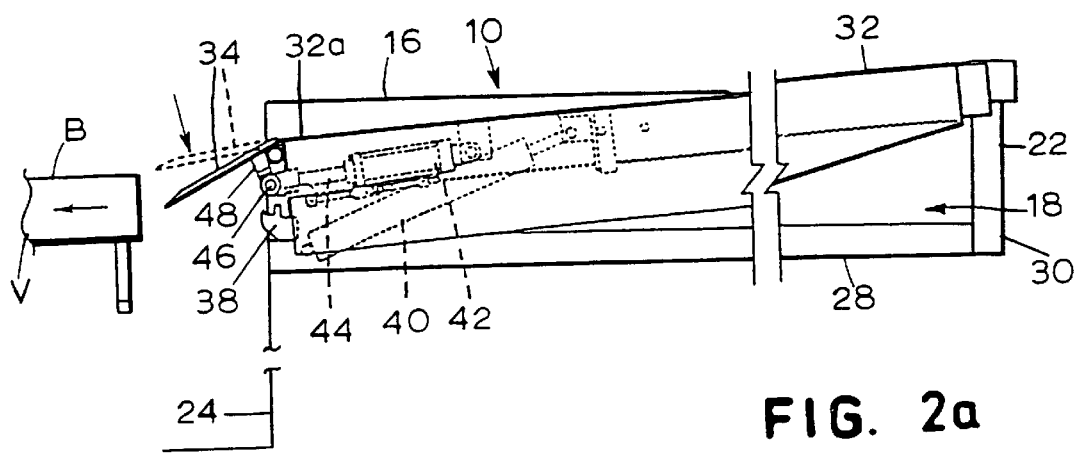
FIG. 2a is a side elevational view of the dock leveler, showing the lip in the extended operative position (in broken lines), and falling towards a retracted or pendant position after vehicle has moved away from the loading dock.
FIG. 2b is an underside perspective view of the dock leveler depicted in FIG. 2a, showing the recycle control system in greater detail.
FIG. 2c is an enlarged schematic view of the recycle control system depicted in FIG. 2b, showing a shuttle and a switch of the recycle system in greater detail.
Figure 6A:
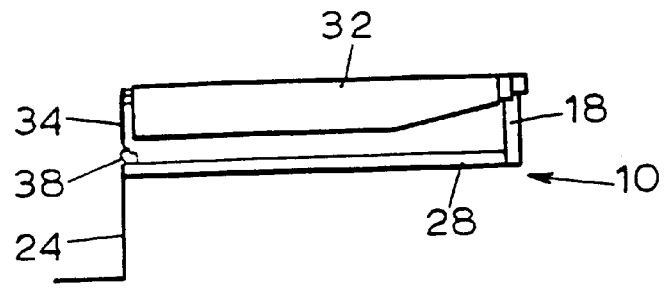
FIG. 6a is a side elevational view of the dock leveler, showing the lip in the pendant position, and the dock leveler in the cross-traffic position.
Figure 6B:
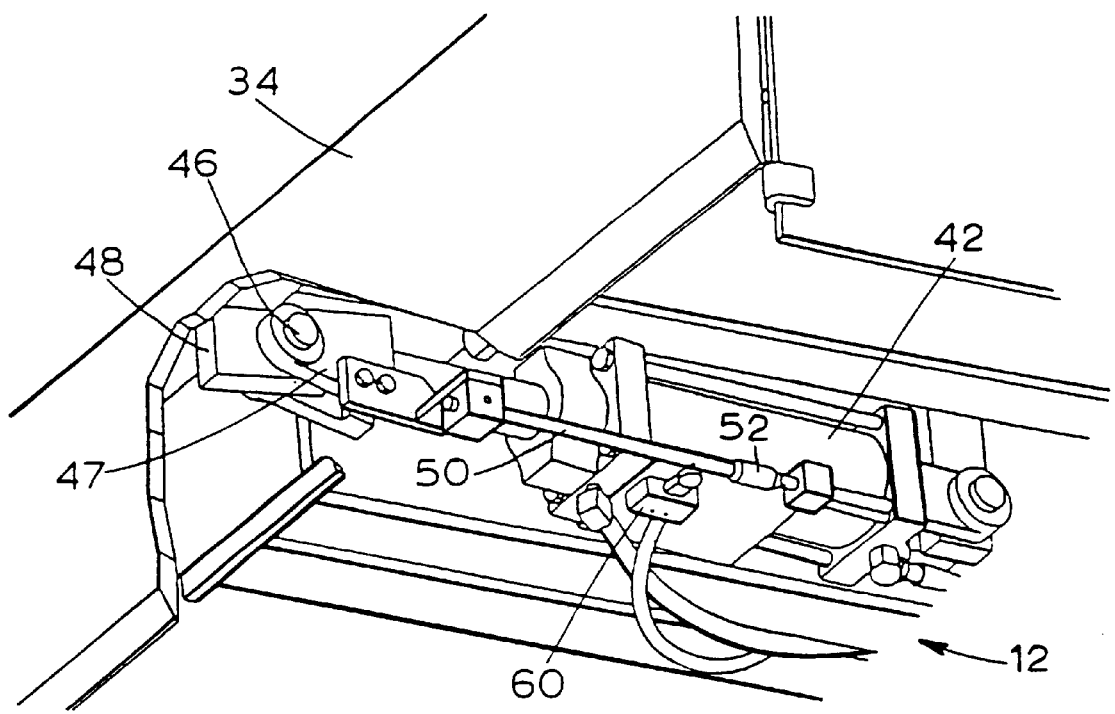
FIG. 6b is an underside perspective view of the dock leveler depicted in FIG. 6a, showing the recycle control system in greater detail.
Figure 7A:
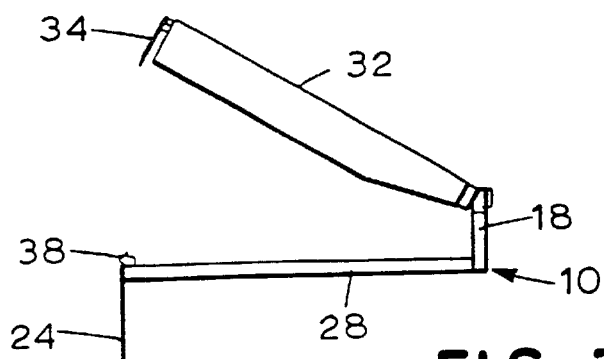
FIG. 7a is a side elevational view of the dock leveler, showing the lip in the pendant position, and the dock leveler in the upwardly extended or raised preparatory position.

As best shown in FIG. 1, the dock leveler 10 is adapted to span the distance between the loading dock 14 and the bed B of the vehicle V. The dock leveler 10 includes a frame having a bottom section 28 mounted to the floor of the pit 18, and a rear section 30 projecting upwardly from the rear of the bottom section 28, as shown in FIG. 2. A ramp or deck 32 is pivotally hinged to the rear section 30 so that the dock leveler 10 can pivot between an upwardly extended or raised preparatory position, as shown in FIG. 7a; a cross-traffic or stored position, as shown in FIG. 6a; and a range of operative position wherein a lip or extension plate 34 of the deck 32 is adapted to engage the bed B of the vehicle V, as shown in FIG. 1. The operative positions span from a downwardly extended position wherein the deck 32 is inclined below the cross-traffic position, as shown in FIG. 2a; to a plurality of intermediate positions, as shown, for example, in FIGS. 3a, 4a, 5a, and 8a. When the deck 32 is in the cross-traffic or stored position, the deck 32 is configured to overlie and enclose the open top of the pit 18 and be substantially flush with the loading surface 16 of the loading dock 14.

Figure 3A:
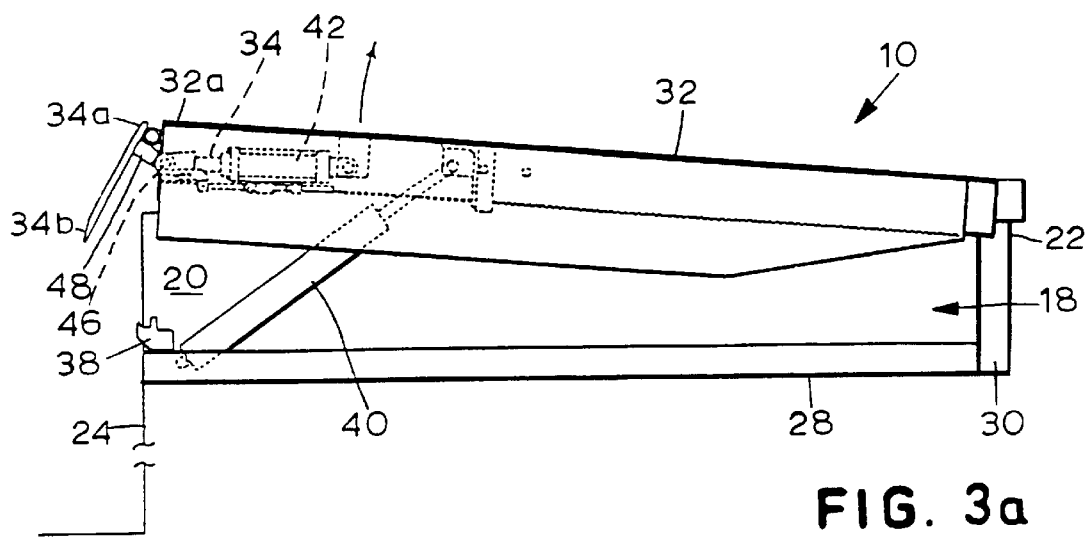
FIG. 3a is a side elevational view of the dock leveler, showing the lip falling towards the pendant position, and an actuator moving the dock leveler towards a raised, intermediate position as the lip moves toward the pendant position.
Figure 5A:
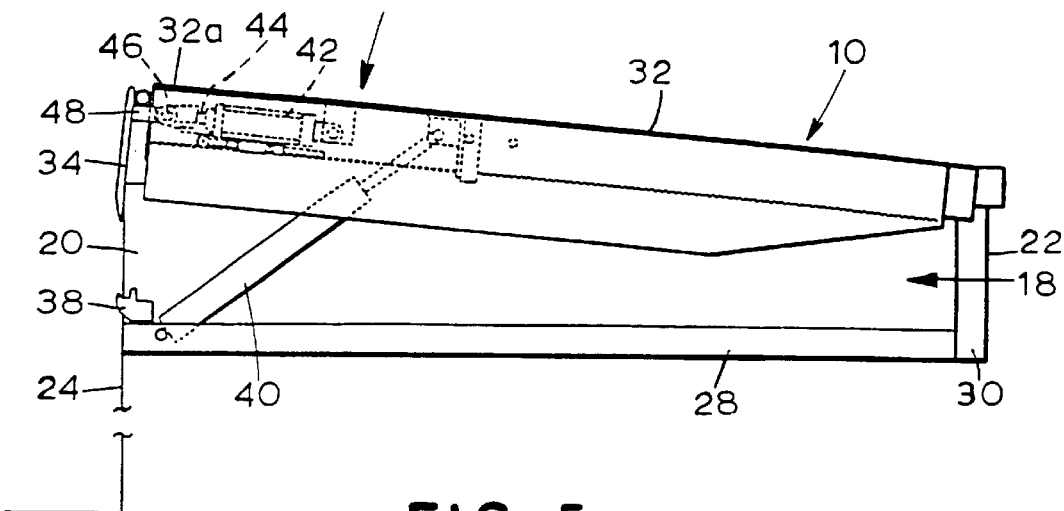
FIG. 5a is a side elevational view of the dock leveler, showing the lip in the pendant position, and the dock leveler moving towards a cross-traffic or stored position.

As best shown in FIGS. 2a, 3a, and 5a, the lip or extension plate 34 is hingedly attached to a front edge portion 32a of the deck 32, and includes a first or proximal end 34a, which is hingedly attached to a ramp header 32 in a conventional manner, and a second or distal end 34b, which is adapted to engage the bed B of the vehicle V. In operation, the lip 34 is movable between a retracted or pendant position, as shown in FIGS. 5a, 6a, and 7a, and a range of extended positions, including the extended operative position, as shown in FIG. 1. In the extended operative position, the lip 34 is also adapted to span the gap created by bumpers 26 which exists between the front edge portion 32a of the deck 32 and the rear of bed B of the vehicle V to facilitate loading and unloading of the vehicle V. For example, when the lip 34 is in the extended operative position, forklift trucks and/or dock personnel may readily move between the deck 32 and the bed B of the vehicle V. As shown in FIG. 1, the lip 34 substantially spans the distance between the bumpers 26. In addition, the lip 34 is preferably formed from tread plate steel which is capable of withstanding substantial loads.

As best shown in FIG. 6a, the bottom section 28 of the dock leveler 10 is provided with keepers 38 which receive and hold the free end 34b of the lip 34 against the front wall 24 of the loading dock 14 and also is configured to support the ramp or deck 32 in a generally horizontal cross-traffic or stored position when the free end 34b is received by the keepers 38.

As is customary in the art, a powered lifting unit, such as hydraulic deck cylinder 40 is provided for moving the deck 32 between the cross-traffic or stored position (FIG. 6a) and the upwardly extended or raised preparatory position (FIG. 7a). In other embodiments (not shown), the lifting unit or deck actuator 40 may alternately comprise a linear actuator such as a screw drive (preferably also including springs for counterbalancing deck weight), or a low-pressure, high-volume fluid actuator such as an air-bag. Other lifting units will be apparent to one of skill in the art.

Figure 8A:
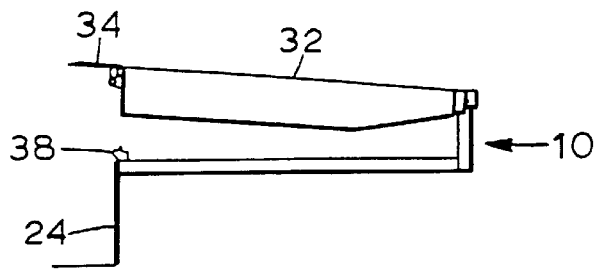
FIG. 8a is a side elevational view of the dock leveler, showing the lip in an extended preparatory position, and the dock leveler in an intermediate position (i.e., a position between the raised preparatory position shown in FIG. 7a and the operative position shown in FIG. 1)

After the vehicle V has been parked adjacent to the front wall 24 of the loading dock 14, the dock leveler 10 is activated to facilitate loading and/or unloading operations. More specifically, the actuator 40 raises the deck 32 from its cross-traffic or stored position (FIG. 6a) to its upwardly or raised preparatory position (FIG. 7a). Thereafter, the lip 34 is moved into the extended position (FIG. 8a). Once this has occurred, power to the lifting unit will be terminated and the deck and extended lip 34 float down to engage the bed B of the vehicle V. Alternatively, an operator typically has controls to extend the lip before the deck is fully raised to the FIG. 7a position.

As shown in FIGS. 2a, 3a, and 5a, the leveler includes an actuator for extending the lip 34, illustratively in the form of a hydraulic actuator 42 with a piston rod 44 which is pivotally attached to the underside of the lip 34 by pin 46 and link 48. Once the deck 32 has been lifted to the upwardly extended position (FIG. 7a), a conventional controller (not shown) may signal the lip actuator 42 to selectively move the piston rod 44 from a retracted position, wherein the lip 34 is positioned in the pendant position (FIG. 7a), to an extended (FIG. 8a). Alternatively, the lip may be extended by operator control (not shown) before the deck is fully raised.

In keeping with an important aspect of the present invention, the recycle control system 12 automatically moves the dock leveler 10 from a position wherein the deck is at its lowermost position (bottomed-out) and the lip is falling (as in FIG. 2a), to an intermediate raised position (FIG. 5a), thereby allowing the lip 34 to move into the pendant position. Subsequently, the pendant lip 34 and the deck 32 may be lowered to the cross-traffic position. In the embodiment shown in FIGS. 2–8, the recycle system 12 comprises means for actuating an outwardly biased limit switch 60 which controls the deck lifting unit 40. More specifically, the actuating means comprises a lip-position member such as rod 50 operatively attached to the lip 34 so that the rod 50 reciprocates between extended and retracted positions in response to movement of the lip 34 between the extended and pendant positions, respectively. In the illustrated embodiment, one end of the rod 50 is rigidly attached to a flange 47 of piston rod 44. In addition, an actuating member illustratively in the form of shuttle member 52 with inclined left and right ends 58l and 58r, respectively, is disposed on the rod 50 for movement relative thereto, illustratively being slidably disposed on the rod 50 for movement between a left position, as shown in FIGS. 2b and 2c, and a right position, as shown in FIGS. 5a and 5c, as defined by left and right pin stops 54 and 56. The rod 50 and shuttle 52 are also disposed adjacent to the limit switch 60 so that, in response to movement of the shuttle 52, the ends 58*l* and 58*r* selectively engage and actuate the limit switch 60 which, in turn, actuates the lifting unit 40 through electronics (not shown).

In the illustrated embodiment, the limit switch 60 includes an outwardly biased linearly actuated roller portion 62 which is selectively engaged by the shuttle 52 as the shuttle 52 moves between the left and right positions on rod 50. The switch 60 is biased outwardly (illustratively by an internal spring, not shown). The switch 60 is operable between a first condition (such as the depressed position of FIGS. 4*b/c*) wherein power is provided to the lifting unit (through electronics coupling the switch and lifting unit, which are apparent to one of skill in the art), and a second condition (such as the undepressed condition of FIGS. 2*b/c*) wherein power is not provided to the lifting unit.

Figure 3B:
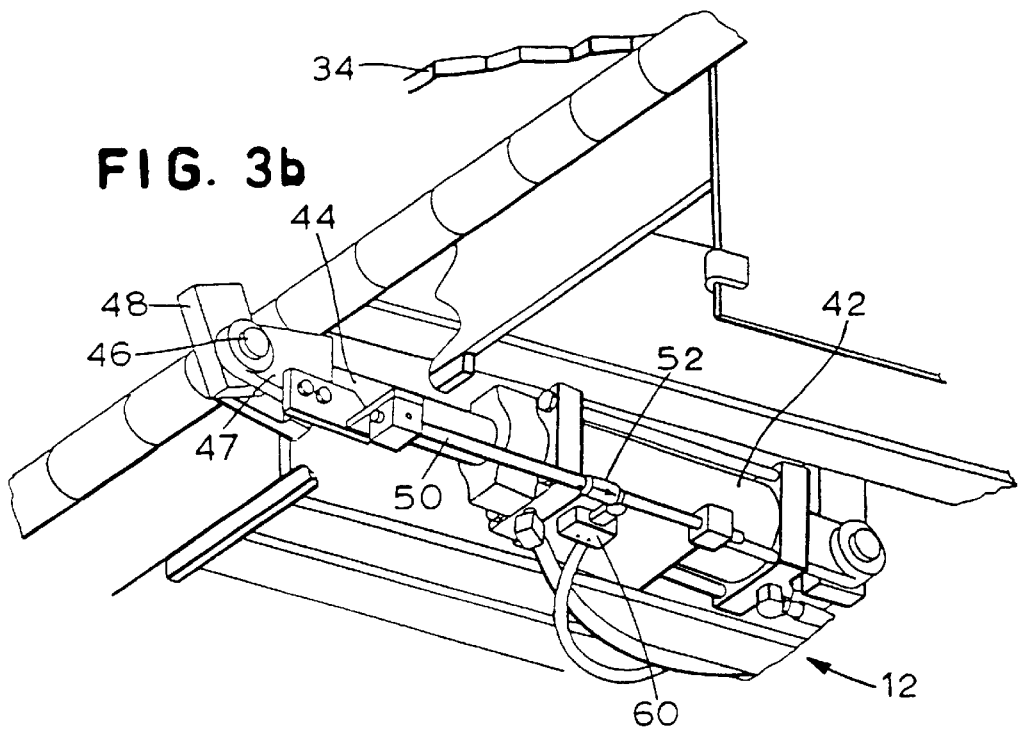
FIG. 3b is an underside perspective view of the dock leveler depicted in FIG. 3a, showing the recycle control system in greater detail.
Figure 3C:
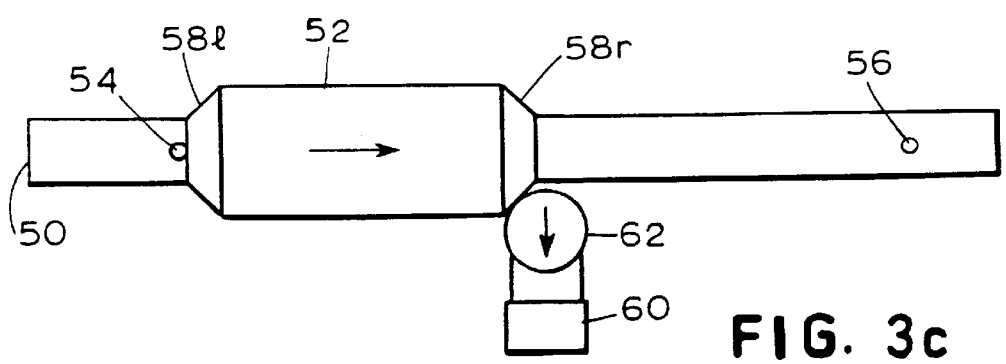
FIG. 3c is an enlarged schematic view of the recycle control system depicted in FIG. 3b, showing the relative position of the shuttle and the switch.

In operation, the angular position of the lip 34 controls the recycle control system 12 by setting the position of the lip-position member or rod 50 and thus the shuttle 52 carried thereon. For example, when the vehicle V is parked adjacent to the loading dock D, the deck 32 is in the operative position, as shown in FIG. 1, and the lip 34 engages the bed B of the vehicle V in an extended position. In addition, the rod 50 is in the extended position, and the shuttle 52 is disposed between the limit switch 60 and the left pin stop 54, as shown in FIGS. 2*b* and 2*c*. When the vehicle V moves away from the loading dock D, however, the lip 34 loses contact with the bed B of the vehicle V and falls, after the deck bottoms out, from the extended operative position toward the pendant position by force of gravity, as shown in FIG. 2*a*. As the lip 34 falls toward the pendant position, the lip 34 moves the rod 50 toward the retracted position (to the right in FIGS. 2*b* and 2*c*), and the left pin stop 54 pushes the shuttle 52 to the right, as indicated by the arrows in FIGS. 2*b* and 2*c*. Note that the position of the left stop pin 54 along rod 52 determines the angle to which the lip must fall before actuating member or shuttle 52 moves the switch 60 to the first condition or depressed position of FIGS. 4*b/c*. As the right end 58*r* of the shuttle 52 engages the limit switch 60, as shown in FIGS. 3*b* and 3*c*, the switch 60 is depressed, whereupon the hydraulic cylinder 40 is activated to raise the deck 32 towards the upwardly extended position, as shown in FIG. 3*a*.

Figure 4A:
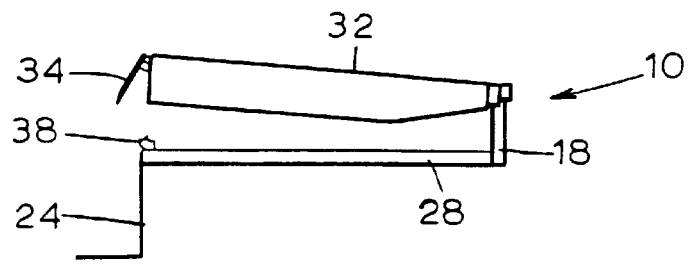
FIG. 4a is a side elevational view of the dock leveler, showing the lip continuing to fall towards the pendant position, and the dock leveler in an intermediate position.
Figure 4B:
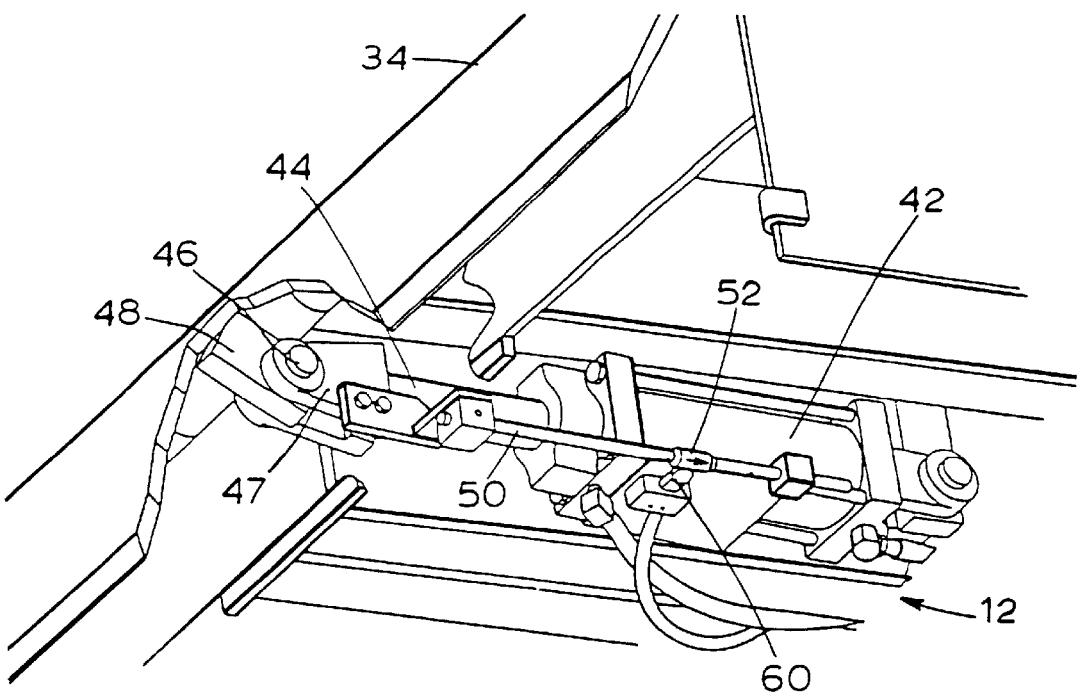
FIG. 4b is an underside perspective view of the dock leveler depicted in FIG. 3a, showing the recycle control system in greater detail.
Figure 4C:
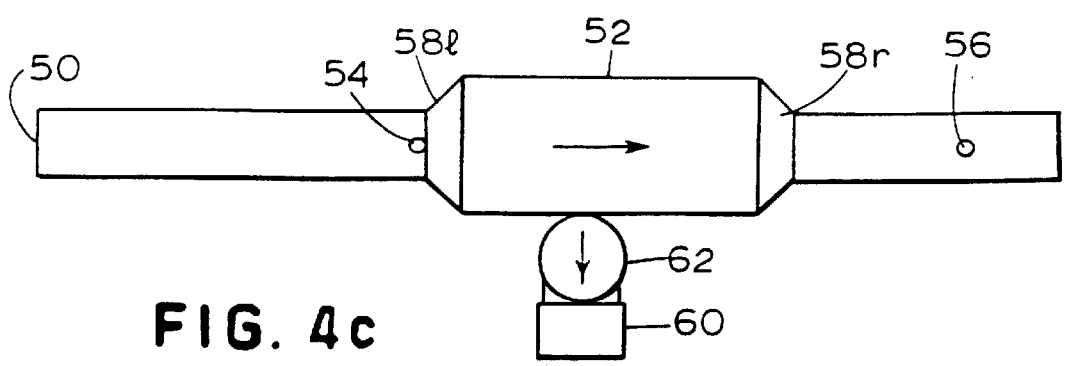
FIG. 4c is an enlarged schematic view of the recycle control system depicted in FIG. 4b, showing the relative position of the shuttle and the switch.

As the lip 34 continues to fall toward the pendant position, as shown in FIG. 4*a*, the lip 34 continues to move the rod 50 toward the retracted position, and the left pin stop 54 pushes the shuttle 52 to the right, as indicated by the arrows in FIGS. 4*b* and 4*c*. Similarly, the middle portion of the shuttle 52 continues to depress the switch 60 so that the hydraulic actuator 40 continues to raise the deck 32.

Figure 5B:
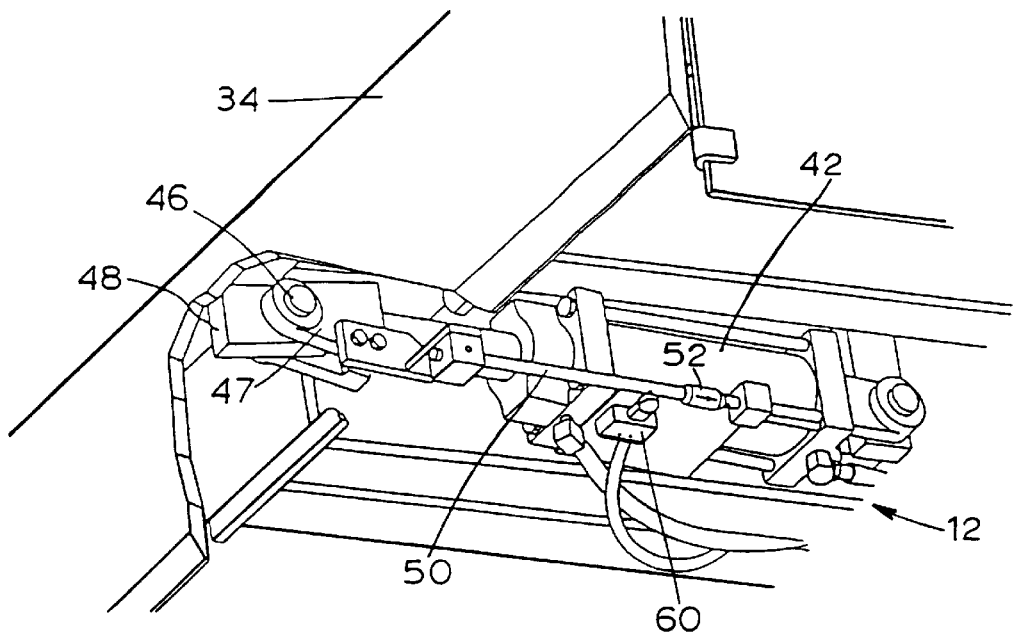
FIG. 5b is an underside perspective view of the dock leveler depicted in FIG. 5a, showing the recycle control system in greater detail.
Figure 5C:
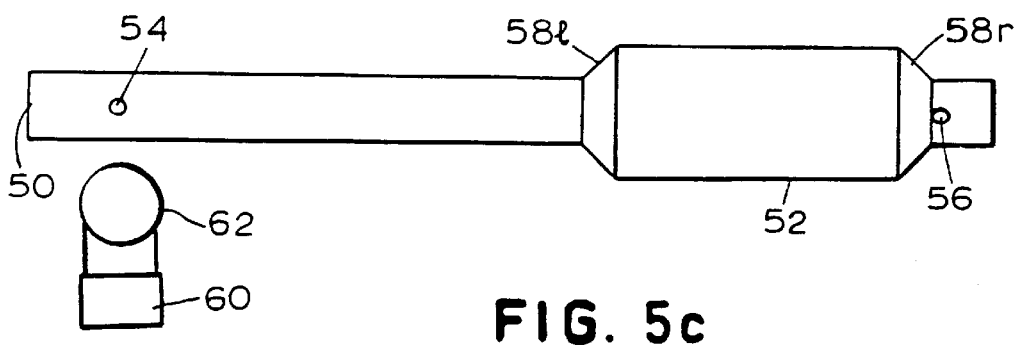
FIG. 5c is an enlarged schematic view of the recycle control system depicted in FIG. 5b, showing the relative position of the shuttle and the switch.

In accordance with an important aspect of the present invention, the recycle control system 12 automatically terminates the upward movement of the deck 32 when the lip 34 reaches the pendant position, thereby preventing unnecessary upward movement of the deck 32. For example, during the above-described rightward travel of the rod 50 and shuttle 52, the roller portion 62 of the limit switch 60 remains depressed, as shown in FIG. 4*c*, until it reaches the left inclined end 58*l* of the shuttle 52, whereupon the biasing force of the limit switch 60 causes the roller portion 62 to extend outwardly which causes the shuttle 52 to move in a rightward direction along the rod 50 until it engages the right pin stop 56, as shown in FIG. 5*c*. This rightward movement is enhanced by the bias in the switch 60 and the angled surface 58*l*. Thus, as the lip 34 reaches the pendant position, as shown in FIG. 5*a*, the limit switch 60 deactivates the hydraulic actuator 40 which terminates the upward movement of the deck 32. To complete the recycle operation, the deck 32 then floats downwardly into the cross-traffic position, as shown in FIG. 6*a*. When the lip 34 is in the pendant position, the rod 50 remains in the retracted position, as shown in FIGS. 5*b* and 5*c*, and the shuttle 52 remains between the limit switch 60 and the right pin stop 56.

Figure 7B:
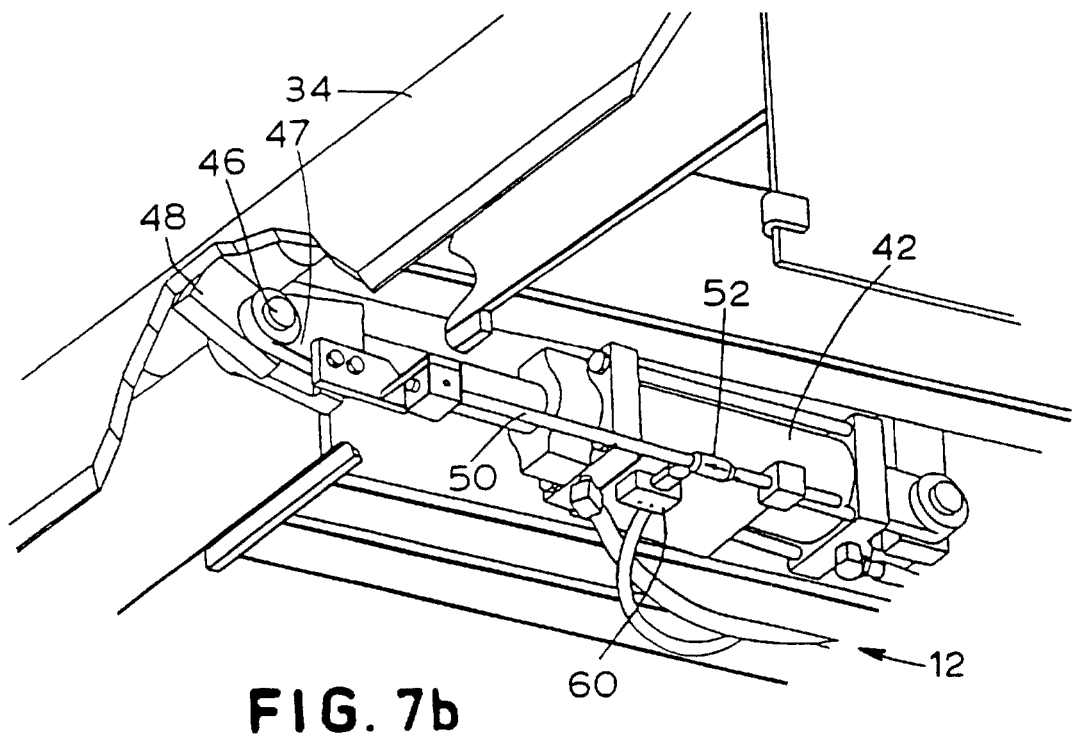
FIG. 7b is an underside perspective view of the dock leveler depicted in FIG. 7a, showing the recycle control system in greater detail as lip extension begins.
Figure 7C:
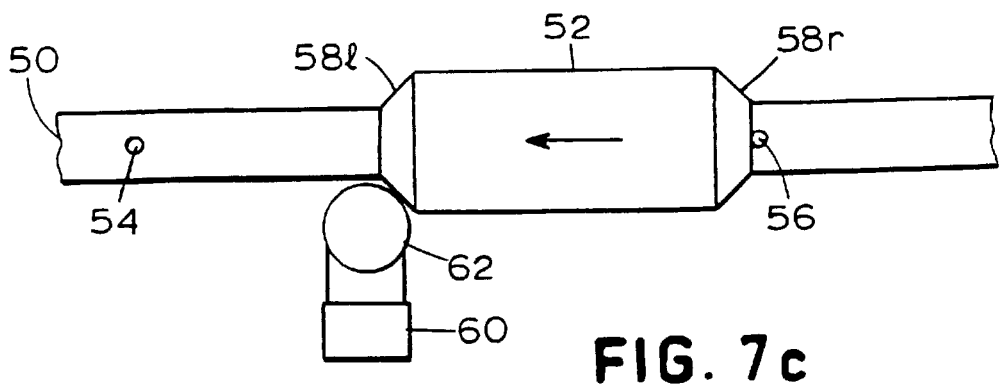
FIG. 7c is an enlarged schematic view of the recycle control system depicted in FIG. 7b, showing the relative position of the shuttle and the switch.
Figure 8B:
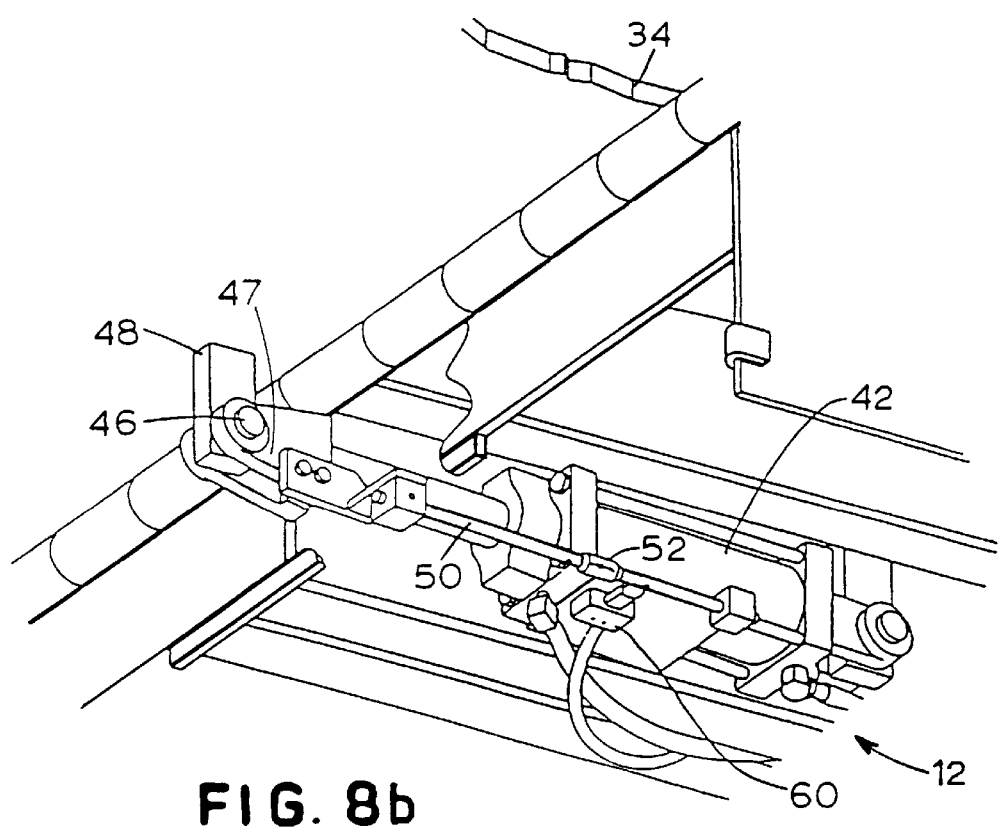
FIG. 8b is an underside perspective view of the dock leveler depicted in FIG. 8a, showing the recycle control system in greater detail as the lip approaches the fully extended position.
Figure 8C:
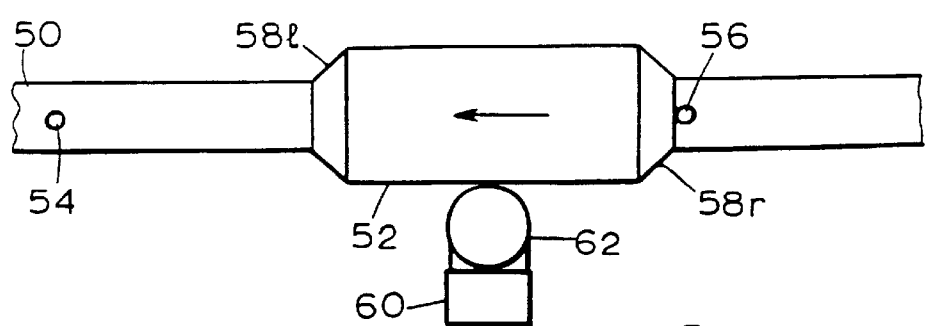
FIG. 8c is an enlarged schematic view of the recycle control system depicted in FIG. 8b, showing the relative position of the shuttle and the switch.
Figure 8D:
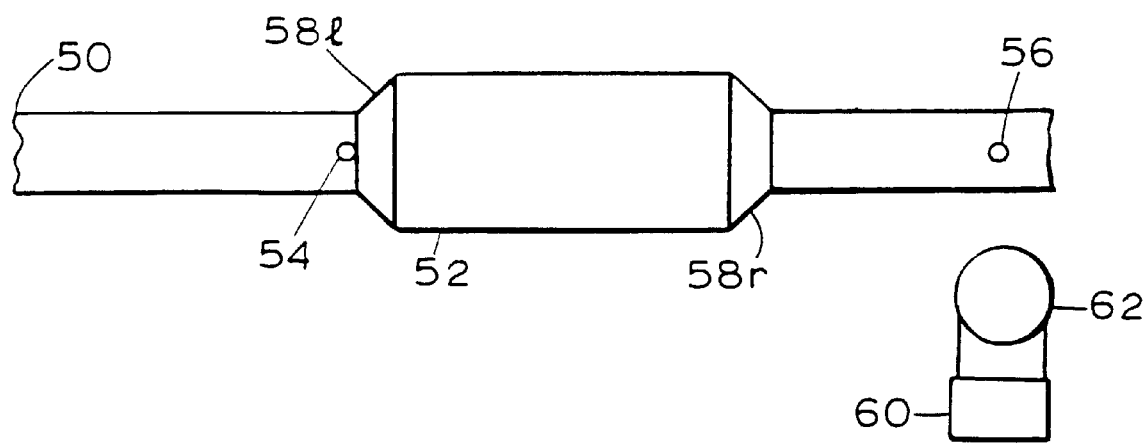
FIG. 8d is an enlarged schematic view of the recycle control system, showing the relative position of the shuttle and switch for full lip extension.

The deck 32 remains in the cross-traffic position until another vehicle V is parked adjacent to the loading dock 14 and it is desired to activate the dock leveler 10. At such time, the hydraulic actuator 40 is activated and the deck 32 is raised to its upwardly extended position, as shown in FIG. 7*a*. Thereafter, the lip actuator 42 is activated to move the lip 34 toward the extended position which causes the rod 50 to move toward the extended position (to the left in FIGS. 7*b* and 7*c*). This leftward movement of the rod 50 causes the right pin stop 56 to push the shuttle 52 leftward, as indicated by the arrows in FIGS. 7*b* and 7*c*. During this leftward travel, the roller portion 62 of the limit switch 60 successively engages the left inclined end 58*l* of the shuttle 52, as shown in FIGS. 7*b* and 7*c*, the middle portion of the shuttle 52 (where the limit switch 60 is depressed), as shown in FIGS. 8*b* and 8*c*, and then the right inclined end 58*r* of the shuttle 52. When the roller portion 62 moves past the right inclined end 58*r* of the shuttle 52, the limit switch 60 opens and the bias of the limit switch 60 causes the roller portion 62 to move outwardly and to push against the right inclined end 58*r* of the shuttle 52 which cause the shuttle 52 to move left along the rod 50 in a direction away from the limit switch 60 until it engages the left pin stop 54, a shown, for example, in FIG. 2*c*. Thereafter, the hydraulic actuator 40 is un-powered to lower the deck 32 towards the operative position, as shown in FIG. 1, wherein the lip 34 engages the bed B of the vehicle V in the extended operative position. When the lip 34 is in the extended operative position, the shuttle 52 remains between the left pin stop 54 and the limit switch 60, as shown in FIGS. 2*b* and 2*c*.

A recycle control system as just described in regard to FIGS. 2–8 has significant advantages over existing systems. The relative movement of shuttle 52 along rod 50 (in this case, linear reciprocating movement) allows for positive disengagement of the actuator/shuttle from the switch. In this embodiment, that disengagement is enhanced by angled surfaces 58*l* and 58*r*, and the bias of switch 50. Moreover, the ability to fix the positions of pins 54 and 56 to limit the motion of actuator/shuttle 52 relative to switch 60 allows this particularly-embodied system to be substantially adjustment-free, and not capable of easily coming out of adjustment in the rugged loading dock atmosphere. Preferably shuttle 52 is formed of a low friction material such as UHMW NYLON to enhance the ease with which it moves relative to lip-position member or rod 50.

An additional embodiment of a recycle control system is shown in FIGS. 9–22. This embodiment differs from the previous embodiment in that the relative motion between the actuator and the lip-position member is rotational, as opposed to translational. And while other differences exist, both of these representative embodiments share common features and advantages. Given the common elements between this and the previous embodiment, similar reference numbers, but within the one-hundred (100) series, will be used.

FIG. 9 is a side elevation of the recycle control system 112. As before, it is mounted adjacent to lip cylinder 142 including a piston rod 144. Connected to a flange 147 of the piston rod 144 is the lip-position member or rod 150 which reciprocates, illustratively linearly, the lip position. Note that the lip is not shown in FIGS. 9–22, and the reader is referred back to FIGS. 2–8 and accompanying text to view its operation. Thus, rod 150 reciprocates with the lip, and its position is thus indicative of lip position or angle relative to the deck. To help maintain linear reciprocating movement of rod 150, a guide bracket 151 may advantageously be mounted to lip cylinder 144. As before, an outwardly biased linearly actuated switch 160 includes a roller 162. Switch 160 is mounted to the underside of lip cylinder 144, as seen most clearly in FIG. 11. This switch 160 is operable between a first, or depressed, condition (FIG. 19b, for example) in which power is provided to the deck lifting unit (not shown), and a second, undepressed, condition in which power is not provided to the lifting unit.

To change the state of switch 160 between the first and second conditions, and thus to provide a recycling operation, an actuator in the form of rotating cam 152 is mounted on rod 150 for movement relative thereto. That relative movement is rotational, and cam 152 is fixed linearly along rod 150. Toward that end, a pair of collars 152, 152b are mounted on rod 150 on either side of and immediately adjacent to cam 152. As rod 150 reciprocates linearly based on lip position, cam 152 tracks its motion. At the same time, cam 152 is free to rotate between a position wherein it moves switch 160 to the first condition, and a position wherein switch 160 can move to the second condition, to provide a recycle function based on lip position.

Figure 12:
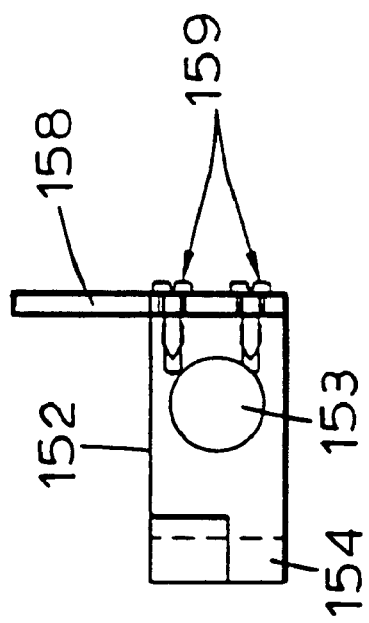
FIGS. 12–14 are end, top, and front views, respectively, of a rotating cam according to the other embodiment.
Figure 13:
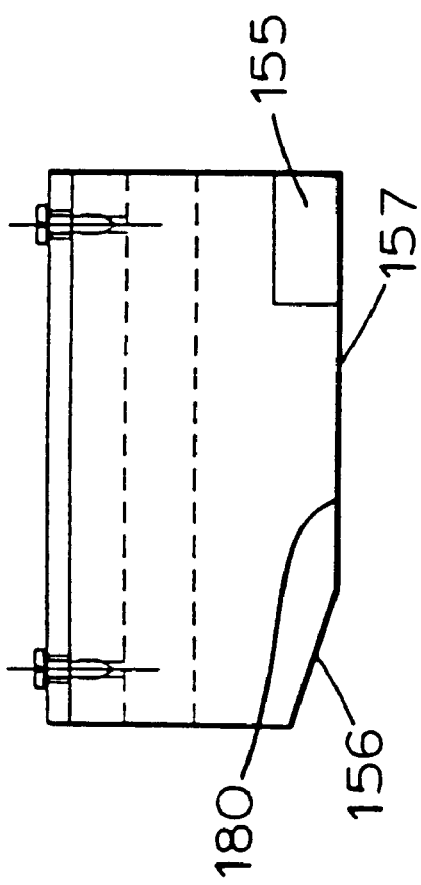
Figure 14:
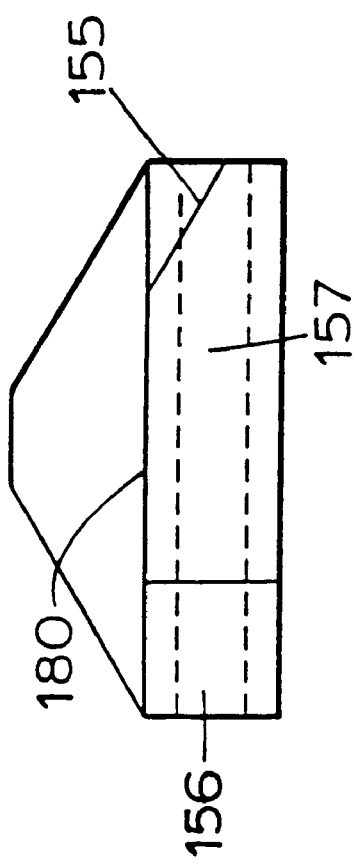

The cam 152 is shown in greater detail in the side, top and end views of FIGS. 12–14, respectively. FIG. 12 is from the same perspective as FIG. 11, and shows a central opening 153 in a main body portion 154 of the cam 152. Preferably, a plate 158 is fixed to a back edge of body 154 by screws 159. As will be described in greater detail below, plate 158 serves as a bias member in the form of a weight that gravitationally biases body 154 to a clockwise rotational position in the sense of FIGS. 9–22. As the comparison of FIGS. 13 and 14 shows, cam 152 also includes a first surface 155 formed in the general rectangular solid 154. A second surface 156 is formed in the longitudinally-opposite end of body 154, and surfaces 155, 156 are separated by face 157. As will be detailed below, surfaces 155, 156 of cam 152 interact with switch 160 and gravity to rotate cam 152 on rod 150, and to operate switch 160 between the first and second conditions to provide a recycle function.

The motion and function of cam 152 with and relative to rod 150 to provide recycle and other functions will be described in greater detail with reference to FIGS. 15–22. In FIGS. 15a and b, a side and end view, respectively, is shown of the recycling control system with the lip in an extended operative position. The cam 152 is disposed in front of, or to the left of switch 160, as rod 150 is in its fully extended position. Rotationally, cam 152 is in a first rotational position wherein body 154 is disposed substantially horizontally. As a result, while cam 152 is still spaced from switch 160, switch 160 is aligned with surface 156 because of the orientation of the cam 152.

As the lip begins to fall (because of the deck bottoming out following, e.g., truck departure without lip retraction) as in FIGS. 16a and b, cam 152 moves rightward, and engages switch 160. Contact between roller 162 and surface 156 causes a camming effect which depresses roller 162 and operates switch 160 to the first condition—thus raising the deck. The cam 152's position in FIGS. 16a/b thus represents a first position of cam 152 in which cam 152 operates switch 160 to the first condition.

Figure 17A:
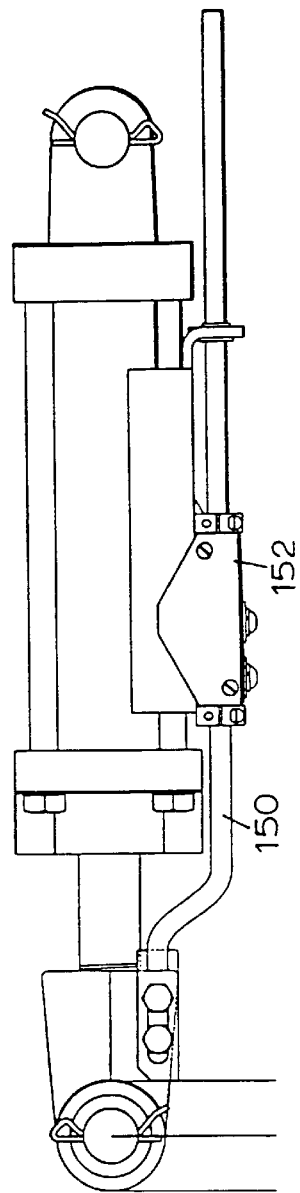

As the lip continues its descent (and the deck raises because of the condition of switch 160) as in FIGS. 17a/b, depressed roller 162 rides along face 157 of cam 152, thus continuing to cause the lifting unit to raise the deck. One of skill in the art will appreciate that the linear position of the cam 152 along rod 150 determines the deck angle at which switch 160 is operated to the first condition.

Figure 18A:
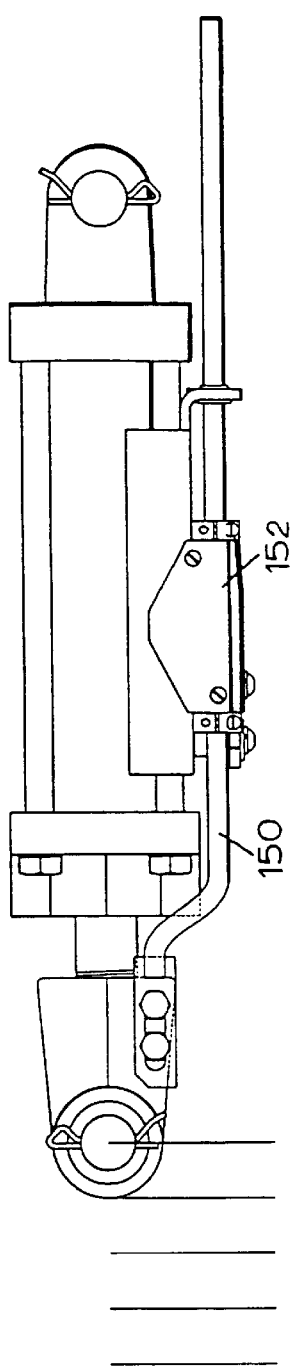
Figure 17B:
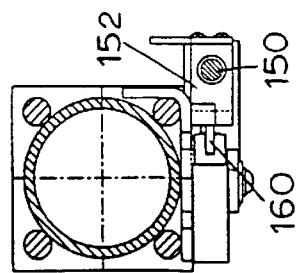
Figure 18B:
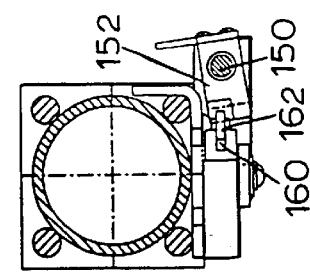

Once the deck has been raised to a position high enough for the lip to have fallen substantially pendant, it is desirable to cease pump operation and allow the deck to float down. Accordingly, cam 152 can move to at least one second position wherein switch 160 can be operated to the second position. Such a second position of cam 152 is shown in FIGS. 18a/b. Here, the cam 152 has translated with rod 150 to a position wherein spring-loaded roller 162 is adjacent to surface 155. Because of the angle of surface 155 relative to face 157 (see FIGS. 13, 14), and the ability of cam 152 to rotate on rod 150, the biasing force tending to extend roller 162 relative to the body of switch 160, will cause cam 152 to rotate counterclockwise in the sense of FIG. 18b, thus allowing switch 160 to operate to the second condition, thereby terminating power to the lifting unit. As shown in FIG. 18b, when the lip is fully pendant, cam 152 may stay in the second position as surface 155 is resting on extend roller 162. Thus cam 152 moved between a first position (FIG. 17b) and a second position (FIG. 18b) as the lip moved from an extended toward the pendant position.

This recycle control system, like that of FIGS. 2–8, also exhibits positive disengagement of actuator/cam 152 from switch 160. That positive disengagement is provided, in part, by the ability of cam 152 to move relative to lip-actuating member or rod 150. Such positive movement of actuator 152 may be advantageous where debris or lack of maintenance to the hinge between the lip and deck has made lip motion more difficult or "sticky." Positive disengagement helps ensure that the switch will operate to the second condition even if a sticky lip retards or slows complete fall of the lip to a pendant position, thus making the system less sensitive to adjustment.

The ability of cam 152 to rotate relative to rod 150 leads to a further operational advantage for this system during lip extension, as depicted in FIGS. 19–22. With the lip pendant, cam 152 is in the position of FIG. 19b—i.e., a second position of cam 152. As the lip begins to extend (FIGS. 20a/b), surface 155 is pulled past undepressed roller 162. Because of the orientation of surface 155, and the fact that a force must be exerted on biased roller 162 to depress it, cam 152 rotates counterclockwise to the third position shown in FIG. 20b. In the third position, extended roller 162 rolls along a top surface 180 of cam 152. Thus, cam 152, which is linearly fixed along rod 150, is pulled by switch 160 without actuating the switch. That is, actuator/cam 152 follows a first path during lip extension in which it does not operate the switch to the first condition, and a second path during at least a portion of the lip's motion from an extended toward a pendant position in which the cam operates the switch to the first condition (the cam during movement in the second path is shown in FIG. 16b). It should be noted that the recycle control mechanism of FIGS. 2–8 did not include this feature.

The two-path function is advantageous as it prevents switch 160 from being actuated during lip extension. Of course, in situations where the same power source (e.g., a hydraulic pump) is used for both deck actuation and lip extension, that power source would already be on during lip extension and actuation of switch 160 would be redundant. However, avoiding such redundancy, as in the present rotating cam system is an advantage generally, as well as in specific instances of leveler operation, as will be appreciated by those of skill in the art.

As the lip reaches full extension, as in FIGS. 22*a/b,* cam 152 will be translated to a position beyond (left in the sense of FIG. 22*a*) switch 160. Accordingly, cam 152 is free to rotate by gravity to the substantially horizontal position shown in FIG. 22*b*. The added weight of cam 152 provided by plate 158 assists cam 152 in rotating from the FIG. 21*b* position to the FIG. 22*b* position once it passes roller 162.

There has thus been disclosed a recycle system in which relative motion between an actuator (translating shuttle or rotating cam) and a lip-position member such that the actuator moves between positions wherein it operates a switch (coupled to the lifting unit) between first and second conditions. In one embodiment, the actuator follows differing paths relative to the switch depending on whether the leveler lip is extending or moving toward the pendant position.

What is claimed is:

1. A recycling control system for a dock leveler including a pivotally mounted deck, a powered lifting unit for raising the deck, and a lip pivotally mounted to the deck for movement between pendant and extended positions, the control assembly comprising:

a lip-position member couplable to the lip for movement therewith such that the position of the lip-position member is indicative of lip position;

a switch couplable to the lifting unit and operable to a first condition wherein power is provided to the lifting unit, and operable to a second condition wherein power is not provided to the lifting unit;

an actuator disposed on the lip-position member for movement relative thereto, and which follows a first path during movement of the lip from the pendant to the extended position wherein the switch remains in the second condition, and which follows a second path during movement of the lip from an extended to the pendant position wherein the actuator operates the switch to the first condition.

2. The system of claim 1, wherein the actuator is disposed on the lip-position member for rotational movement relative thereto.

3. A recycling control system for a dock leveler including a pivotally mounted deck, a powered lifting unit for raising the deck, and a lip pivotally mounted to the deck for movement between pendant and extended positions, the control system comprising:

a lip-position member couplable to the lip for movement with the lip between the pendant and extended positions such that the position of the lip-position member is indicative of the position of the lip;

a switch couplable to the lifting unit and operable to a first condition wherein power is provided to the lifting unit, and operable to a second condition wherein power is not provided to the lifting unit; and an actuator disposed on the lip-position member for translational movement relative thereto between at least a first position where the actuator operates the switch to the first condition, and a second position where the switch can be operated to the second condition without interference from the actuator, the actuator being disposed and moved between the first and second positions as the lip moves toward the pendant position.

4. The system of claim 3, wherein the translational movement of the actuator is limited by stops disposed on the lip-position member.

5. The system of claim 3, wherein the actuator is cylindrical shuttle disposed for sliding translational movement along the lip-position member.

6. The system of claim 5, wherein the shuttle includes at least one tapered surface for assisting the movement of the shuttle from the first to the second position as the switch is operated from the first to second condition.

7. A recycling control system for a dock leveler including a pivotally mounted deck, a powered lifting unit for raising the deck, and a lip pivotally mounted to the deck for movement between pendant and extended positions, the control system comprising:

a lip-position member having a longitudinal axis couplable to the lip for movement with the lip between the pendant and extended positions, such that movement being along the longitudinal axis, such that the position of the lip-position member is indicative of the position of the lip;

a switch couplable to the lifting unit and operable to a first condition wherein power is provided to the lifting unit, and operable to a second condition wherein power is not provided to the lifting unit; and an actuator disposed on the lip-position member for rotational movement relative thereto about the longitudinal axis between at least a first position where the actuator operates the switch to the first condition, and a second position where the switch can be operated to the second condition without interference from the actuator, the actuator being disposed and moved between the first and second positions as the lip moves toward the pendant position, wherein the actuator is moveable to a third position during movement of the lip from a pendant to an extended position, wherein the switch is maintained in its second condition.

\* \* \* \* \*